United States Patent [19]

Webster et al.

[11] 4,101,623

[45] Jul. 18, 1978

[54] METHOD OF LINING PIPES

[75] Inventors: John David Webster; Anthony Austin Wilkinson, both of St. Austell, England; Frederick George Tucker, Tennille, Ga.

[73] Assignee: English Clays Lovering Pochin & Co. Ltd., England

[21] Appl. No.: 631,095

[22] Filed: Nov. 11, 1975

[30] Foreign Application Priority Data

Nov. 21, 1974 [GB] United Kingdom ............... 50586/74

[51] Int. Cl.[2] .......................... B29D 9/00; B29G 7/00

[52] U.S. Cl. .................................... 264/270; 264/102; 264/344

[58] Field of Search ............... 264/270, 269, 311, 102, 264/344; 164/116

[56] References Cited

U.S. PATENT DOCUMENTS

| | | | |
|---|---|---|---|
| 1,620,831 | 3/1927 | Moore | 164/116 |
| 1,678,641 | 7/1928 | Holthaus | 164/116 |
| 1,802,613 | 4/1931 | Millspaugh | 164/116 |
| 2,344,020 | 3/1944 | Boucher | 164/116 |
| 2,675,333 | 4/1954 | Tront et al. | 264/270 |
| 3,290,426 | 12/1966 | Barrentine | 264/311 |
| 3,584,105 | 6/1971 | Pekor | 264/311 |

FOREIGN PATENT DOCUMENTS

| | | | |
|---|---|---|---|
| 322,271 | 2/1972 | U.S.S.R. | 264/270 |

*Primary Examiner*—James B. Lowe

*Attorney, Agent, or Firm*—Larson, Taylor and Hinds

[57] ABSTRACT

A method of lining a pipe with thermosetting synthetic plastics material including the steps of arranging the pipe with its longitudinal axis inclined at an acute angle to the horizontal, introducing liquid lining material into the pipe at a predetermined rate for a predetermined time, shifting the pipe to a horizontal position shortly before or at the completion of introduction of the liquid material, spinning the pipe about its axis and blowing hot air axially through the pipe after spinning has started but before the lining material has set thereby to remove entrained air bubbles. The method is particularly applicable for lining pipes with polyurethane, especially pipes with end flanges and covers to form an end face of the lining material.

9 Claims, 4 Drawing Figures

METHOD OF LINING PIPES

Figure 1:
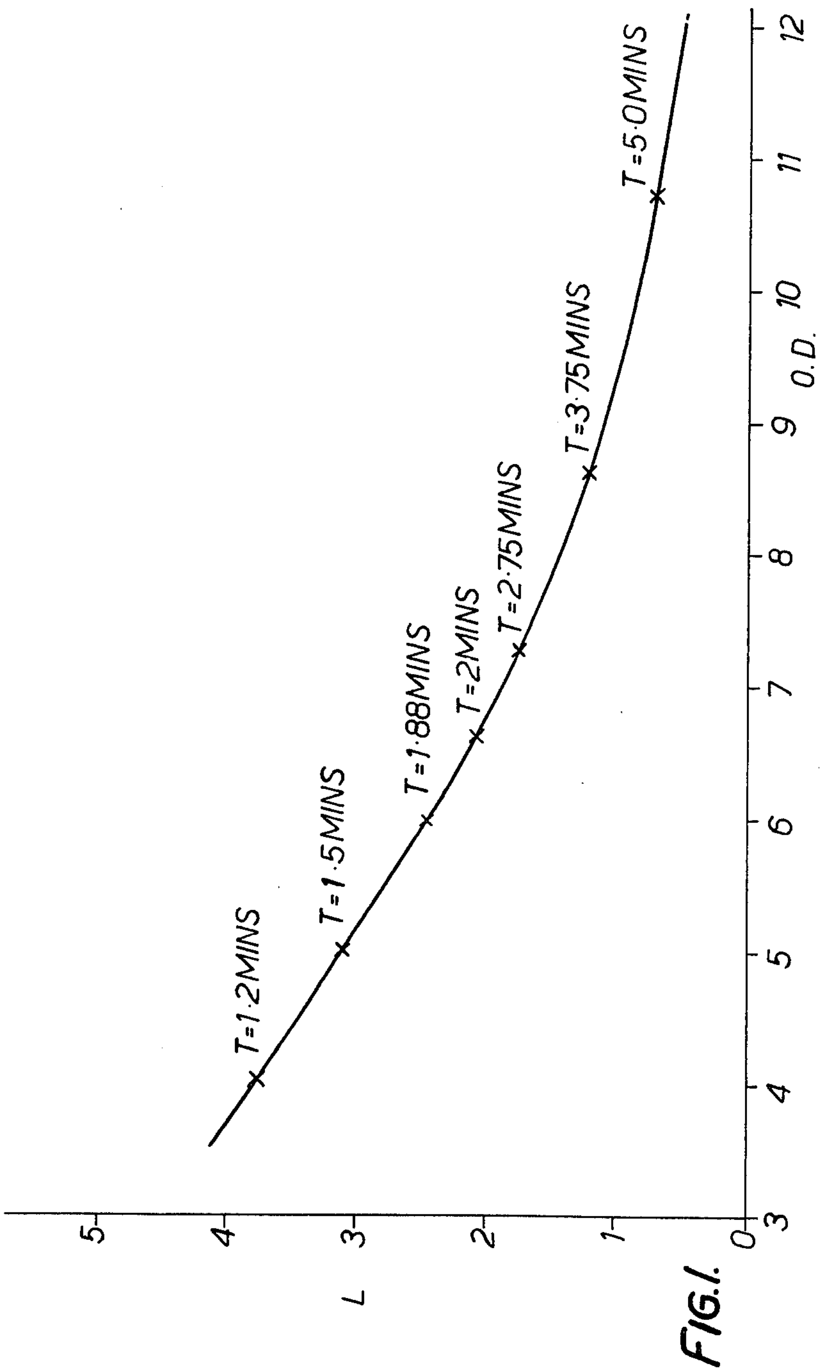

This invention relates to a method of lining a pipe, or other tubular or hollow cylindrical article with a settable material which can be introduced into a pipe in liquid form and which material is capable of setting to form a solid material; the invention constitutes a modification of the invention, referred to herein as the main invention, described in our earlier application Ser. No. 395,065, which was abandoned in favor of continuation application Ser. No. 623,060.

In a preferred feature of the main invention, after introduction of the liquid material and at the start of spinning, hot gas, for example air, is blown through the pipe to cause entrained air bubbles in the liquid to be removed.

According to the present invention there is provided a method of lining a pipe, or other tubular or hollow cylindrical article, herein referred to as a pipe, with a permanent lining of thermosetting synthetic plastics material which can be introduced into a pipe in the form of a liquid mixture of prepolymer and curing agent, which mixture is capable of setting to a resilient solid material, the method comprising arranging the pipe with its longitudinal axis inclined at a predetermined acute angle to the horizontal, introducing the liquid mixture at a predetermined rate into an upper part of the pipe whereby the liquid mixture which is first introduced into the pipe flows along the inside wall of the pipe and the mixture is distributed along a length of pipe, the liquid mixture being introduced into the pipe for a predetermined time, shifting the pipe to a horizontal position, and spinning the pipe about its longitudinal axis to distribute the liquid mixture around the inside of the wall of the pipe, spinning being continued until the plastics material has set, and wherein after spinning has started thereby to obtain an initial distribution of the material around the inside of the pipe, gas, for example air, at a temperature higher than the prevailing temperature of the lining material is blown axially through the pipe for a relatively short period of time to cause entrained air bubbles in the liquid material to be removed.

The period of time for which the hot air is blown through the pipe will depend on various factors, for example the length of the pipe and the lining material, but for the specific lining material described in Application Ser. No. 395,065 i.e. a mixture of Adiprene and MOCA, a blowing time of 30 secs. has been found to be satisfactory for pipes 10 ft. long and 45 secs. for pipes 20 ft. long, these figures applying for pipes of 6 ins. internal diameter and larger. With smaller diameter pipes it may be possible to spin the pipes at a sufficiently high speed that the hot air blast is not necessary, the bubbles of entrained air being removed automatically by the action of centrifugal force on the mixture. For pipes 6 ins. or larger, non-straightness in the pipe may impose a practical limitation on the speed of spinning and thus the hot air blast method of air removal becomes necessary.

Using an Adiprene and MOCA polyurethane mix, which has a relatively short pot life, the hot air blast must be blown down the pipe before 6 mins. have elapsed after the commencement of spinning, and preferably the hot air blast is blown through the pipe within a period of from 1½ mins. to 4 mins. after the start of spinning.

In a specific embodiment of the main invention, the pipes to be lined are provided with end flanges to which are bolted covers with an intermediate spacer ring so as to afford an annular cavity adjacent the radially inner part of each flange for forming end faces of the lining material integral with the pipe lining proper. Each cover is provided with a centrally-aligned hole which is substantially smaller than the inside diameter of the pipe after lining.

It has now been found that for this specific embodiment, when the hot air blast is blown through the pipe, the small hole in the cover at the downstream end impedes the rapid flow of hot air through the pipe. Thus it is desirable in this case to make the hole in the downstream cover larger than that in the cover at the end through which the air blast is introduced.

However, a disadvantage of this is that when introducing the liquid material into the inclined pipe, if there is a delay between the instant at which introduction of the liquid material is completed and the shifting of the pipe to the horizontal there is a risk that the liquid material may run out of the enlarged hole in the cover at the lower end of the pipe. To avoid such a risk it is proposed to shift the pipe to the horizontal shortly before the introduction of the liquid material is completed.

Thus according to a specific feature of the invention, in the method of lining a pipe, the pipe is shifted to a horizontal position prior to completing the introduction of the selected amount of liquid mixture, and when the introduction of liquid mixture is completed spinning is commenced.

Figure 2:
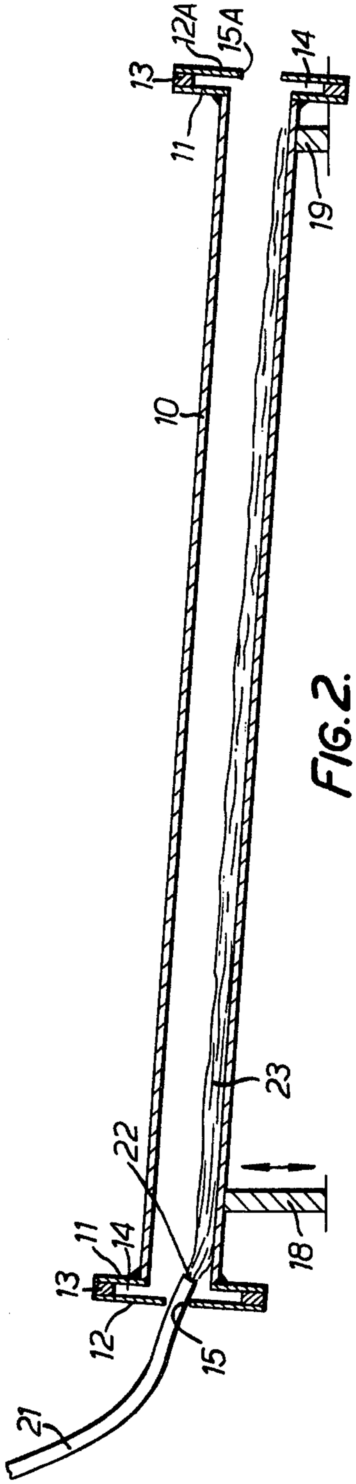
Figure 3:
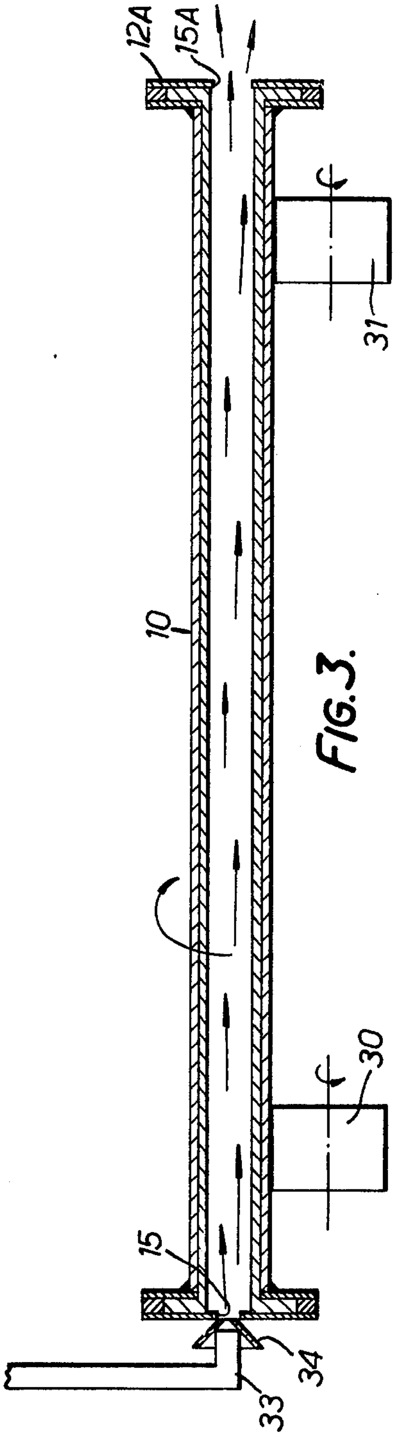
Figure 4:
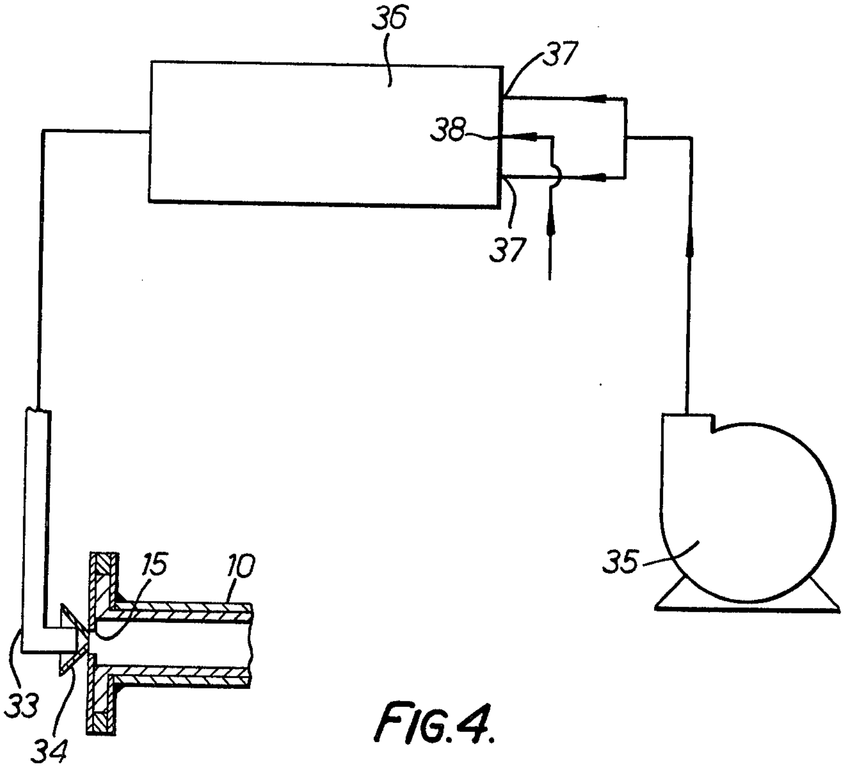

The invention may be carried into practice in a number of ways but one specific embodiment will now be described, by way of example only, with reference to the accompanying drawings, in which:

FIG. 1 shows a graph plotting the end lift (L) required against outside diameter (O.D.) for a pipe 20 ft. long which is to be lined, FIG. 2 shows an inclined pipe, in section, having polyurethane lining material in liquid form delivered into it, FIG. 3 shows the pipe of FIG. 1 in the horizontal position shortly after spinning is commenced, having hot air blown through it, and FIG. 4 is a diagrammatic layout of the arrangement for supplying the hot air to the pipe.

The lining procedure is generally in accordance with that specifically described in our application Ser. No. 395,065. Thus the lining material is a polyurethane formed of Adiprene (Registered Trade Mark) and M.O.C.A. which are prepared and continuously recycled to a mixing head which can be operated to mix the reagents and deliver them to the pipes to be lined. The pipes 10 are prepared by cleaning and lining with a suitable bonding agent, by fitting covers 12 and 12A to respective ends, and by preheating.

Two of the preheated pipes 10 are moved into the "filling" and spinning station onto supports 18 and 19 (FIG. 2) and the support 18 of each pipe is then raised slightly to incline the pipes at a predetermined angle, which angle depends upon the length of the pipe, the diameter and the amount of lining material to be introduced. FIG. 1 shows a graph showing the required amount of lift L, in inches, at the upper end of the pipe for various external diameters O.D., in inches, applicable for pipes 20 ft. long and requiring to be lined with a lining ⅜ ins. thick. The graph also shows for various points on the graph the pouring time T to be used.

The pipes 10 are then ready for introducing the liquid polyurethane mix. The mixing head is then started, a timer clock being started simultaneously so as to measure the pouring time T. The polyurethane mix is discharged at a rate of 10 kg./min. through a flexible hose 21 the lower end 22 of which is inserted into a hole 15 of the cover 12 at the raised end of one of the pipes 10.

The polyurethane mixture indicated at 23 in FIG. 2 flows down the inclined pipe 10 towards the lower end. Shortly before the end of the predetermined pouring time T, i.e. the time required for delivering the selected amount of lining material at the predetermined rate, the pipe 10 is shifted to the horizontal position while pouring continues. The reason for this is that if the pipe is kept in the inclined position until pouring has been completed there is a risk that if a delay occurs in then shifting the pipe to the horizontal the liquid mix will flow too much to the lower end of the pipe with the undesirable consequences that the resultant lining may be too thin at the introduction end and that the lining material may flow out of the hole 15A in the cover 12A at the lower end of the pipe.

The precise instant at which the pipe is levelled will depend upon the pouring time but in general it has been found that the pipe should be levelled after approximately 4/5ths to 9/10ths of the complete pouring time T. For example for T = 5 min. the pipe is levelled after 4 min. 30 secs. have elapsed; for a 2 min. pouring time it is levelled after about 1 min. 45 secs. have elapsed.

When the pouring time is completed, with the pipe 10 now horizontal, the pipe is spun by means of driven rollers 30 and 31 at an appropriate speed to distribute the lining material. It is thought that during the first few revolutions the liquid mixture in the pipe gets churned under the combined rotational and gravitational effect and air gets entrained in the mixture. Once the speed of rotation has increased sufficiently the lining wil be kept against the inside of the pipe by centrifugal force.

To remove the entrained air a blast of hot air is blown through the pipe. This step is illustrated in FIG. 3. Air at between 300° to 400° C is blown via an injector tube 33 fitted with a cowl 34 to ensure that the injector nozzle fills the hole 15 in the cover 12 and that the hot air is blown axially down the pipe; if the hot air is not blown axially down the pipe the air may impinge directly on the lining and burn the material. The hot air injector is applied to the spinning pipe 10 approximately 2–3 mins. after spinning commences, to allow for the initial distribution of the lining material around the pipe, for one relatively short period of time, e.g. 30 secs. for a 10 ft. pipe and 45 secs. for a 20 ft. pipe.

It will be noted from FIGS. 2 and 3 that the centrally-disposed hole 15A in the cover 12A at the downstream end of the pipe is larger than the hole 15 in the cover 12 at the upstream end. This is to allow the hot air blast to flow rapidly through the pipe; if the hole 15A is not so enlarged the hot air would not flow sufficiently quickly through the pipe and uneven results would occur.

It is thought that the hot air flowing through the pipe which at this stage is at a temperature of around 100° C, causes the bubbles of entrained air to expand and burst so as to release the entrained air so that the resultant lining has a glassy smooth finish. If the entrained bubbles of air are not removed then the depressions which are left in the finished lining are likely to act as centres of erosion and result in more rapid wear in the lining of the pipe as a result of abrasive material passing through it.

The hot air for the blast is prepared as shown in FIG. 4. A fan 35 delivers air under a pressure of 30 – 35 ins. of water to a heater tube 36 via four inlets 37 which are spaced around a central flame tube 38 to which propane gas is supplied. In the heater tube 36 is a flame igniter, a flame detector which acts as a safety device to control the supply of propane gas, and a thermometer. The inflowing air is heated by the propane flame and this hot air is passed under pressure to the injector tube 33.

After blowing the hot air through the pipe, the injector is removed and spinning is continued for approximately 30 mins. until the polyurethane has set; the pipes are then held at an elevated temperature for a further period until the polyurethane has been completely cured to form a resilient solid lining to the pipe.

We claim:

1. A method of lining a pipe, or other tubular or hollow cylindrical article, herein referred to as a pipe, with a permanent lining of thermosetting synthetic plastics material which can be introduced into a pipe in the form of a liquid mixture of prepolymer and curing agent, which mixture is capable of setting to a resilient solid material, the method comprising arranging the pipe with its longitudinal axis inclined at a predetermined acute angle to the horizontal, introducing the liquid mixture at a predetermined rate into an upper part of the pipe whereby the liquid mixture which is first introduced into the pipe flows along the inside wall of the pipe and the mixture is distributed along a length of pipe, the liquid mixture being introduced into the pipe for a predetermined time, shifting the pipe to a horizontal position, and spinning the pipe about its longitudinal axis to distribute the liquid mixture around the inside of the wall of the pipe, spinning being continued until the plastics material has set, and wherein, after spinning has started thereby to obtain an initial distribution of the material around the inside of the pipe, gas at a temperature higher than the prevailing temperature of the lining material is blown axially through the pipe for a relatively short period of time to cause entrained air bubbles in the liquid material to be removed, said pipe being fitted with a flange at each end and covers being fitted to the flanges, each said cover having a hole centrally located therein and the hole in the cover at the downstream end of the pipe, relative to the blowing direction of the hot gas, being larger than the hole in the cover at the end through which the gas blast is introduced, said pipe being shifted to its horizontal position after approximately 4/5th to 9/10th has elapsed of the predetermined time for introducing the liquid mixture into the pipe at the predetermined rate.

2. A method as claimed in claim 1, characterised in that the thermosetting synthetic plastics material is a polyurethane made from a urethane elastomer prepolymer by reaction with a suitable curing agent.

3. A method as claimed in claim 1, characterised in that the hot gas is blown through the pipe for a relatively short time within the period from when the pipe has attained a spinning speed sufficient to keep the lining material against the inside of the pipe by centrifugal force to before 6 mins. have elapsed after the start of spinning.

4. A method as claimed in claim 3, characterised in that the hot gas is blown through the pipe within the period of from $1\frac{1}{2}$ mins. to 4 mins. after the start of spinning.

5. A method as claimed in claim 1, characterised in that the hot gas is blown through the pipe for a duration of from 20 to 60 secs.

6. A method as claimed in claim 1, characterised in that the prevailing temperature of the lining material at the start of spinning is approximately 100° C, and in that the temperature of the hot gas is from 300° to 400° C.

7. A method as claimed in claim 2 wherein said urethane elastomer prepolymer comprises an isocyanate-terminated polyether.

8. A method as claimed in claim 2 wherein said urethane elastomer prepolymer comprises an isocyanate-terminated polyether and said curing agent comprises a diamine.

9. A method as claimed in claim 5 wherein said hot gases blow through the pipe for a duration of 30 to 45 seconds.

* * * * *